(12) United States Patent
Kax et al.

(10) Patent No.: US 11,980,268 B2
(45) Date of Patent: May 14, 2024

(54) BAG FOR PROTECTION AND TRANSPORT OF BICYCLES

(71) Applicant: DB Equipment AS, Oslo (NO)

(72) Inventors: Henrik J. S. Kax, Johanneshov (SE); Truls Kristian Brataas, Elverum (NO)

(73) Assignee: DB Equipment AS, Oslo (NO)

( * ) Notice: Subject to any disclaimer, the term of this patent is extended or adjusted under 35 U.S.C. 154(b) by 881 days.

(21) Appl. No.: 16/975,898

(22) PCT Filed: Feb. 28, 2019

(86) PCT No.: PCT/NO2019/050045
§ 371 (c)(1),
(2) Date: Aug. 26, 2020

(87) PCT Pub. No.: WO2019/168409
PCT Pub. Date: Sep. 6, 2019

(65) Prior Publication Data
US 2021/0000234 A1    Jan. 7, 2021

(30) Foreign Application Priority Data
Feb. 28, 2018 (NO) .................................... 20180306

(51) Int. Cl.
*A45C 13/04*     (2006.01)
*A45C 5/14*      (2006.01)
(Continued)

(52) U.S. Cl.
CPC ................ *A45C 13/04* (2013.01); *A45C 5/14* (2013.01); *A45C 7/0036* (2013.01); *B62H 3/02* (2013.01);
(Continued)

(58) Field of Classification Search
CPC ...... B65D 85/68; B65D 21/086; A45C 13/04; A45C 13/06; A45C 7/0036; B62H 3/10; B62H 3/08; B62H 3/02; B62J 19/00
(Continued)

(56) References Cited

U.S. PATENT DOCUMENTS 4,991,715 A     2/1991  Williams
2003/0097803 A1 5/2003  Voorhees
(Continued)

FOREIGN PATENT DOCUMENTS

CN    205652254 U    10/2016
CN    205854332 U    1/2017
(Continued)

OTHER PUBLICATIONS

International Search Report and Written Opinion dated May 24, 2019 (PCT/NO2019/050045).
Norwegian Search Report dated Sep. 26, 2018 for Norwegian Application No. 20180306.

*Primary Examiner* — Anthony D Stashick
*Assistant Examiner* — Raven Collins
(74) *Attorney, Agent, or Firm* — Alix, Yale & Ristas, LLP

(57) ABSTRACT

A bicycle bag for storage and transport of a bicycle, the bag comprising a protective frame which comprises a rigid longitudinal bottom frame, a substantially vertical front and rear frame extending upwards from the longitudinal ends of the bottom frame, and a detachable top frame extending between upper ends of the front and rear frames. The frame defines a protective cavity arranged to accommodate the bicycle, and further comprises a bicycle support for fastening of the bicycle to the bottom frame, and a flexible cover configured to enclose the protective frame. The vertical frame parts are hinged to be folded when collapsing the bag for storage.

20 Claims, 11 Drawing Sheets

(51) Int. Cl.
*A45C 7/00* (2006.01)
*B62H 3/02* (2006.01)
*B62H 3/10* (2006.01)
*B62J 19/00* (2006.01)
*B65D 85/68* (2006.01)

(52) U.S. Cl.
CPC ................ *B62H 3/10* (2013.01); *B62J 19/00* (2013.01); *B65D 85/68* (2013.01); *B65D 2585/6862* (2013.01)

(58) Field of Classification Search
USPC .......................................................... 206/335

See application file for complete search history.

(56) References Cited

U.S. PATENT DOCUMENTS

| | | | |
|---|---|---|---|
| 2015/0266664 A1* | 9/2015 | Noer | A45C 13/02 206/216 |
| 2018/0044103 A1* | 2/2018 | Gustavsson | A45C 13/103 |

FOREIGN PATENT DOCUMENTS

| | | |
|---|---|---|
| DE | 4235158 A1 | 4/1994 |
| DE | 202015102012 U1 | 8/2015 |
| JP | 2005170293 A | 6/2005 |
| WO | 2015139169 A1 | 9/2015 |
| WO | 2017213515 A1 | 12/2017 |

* cited by examiner

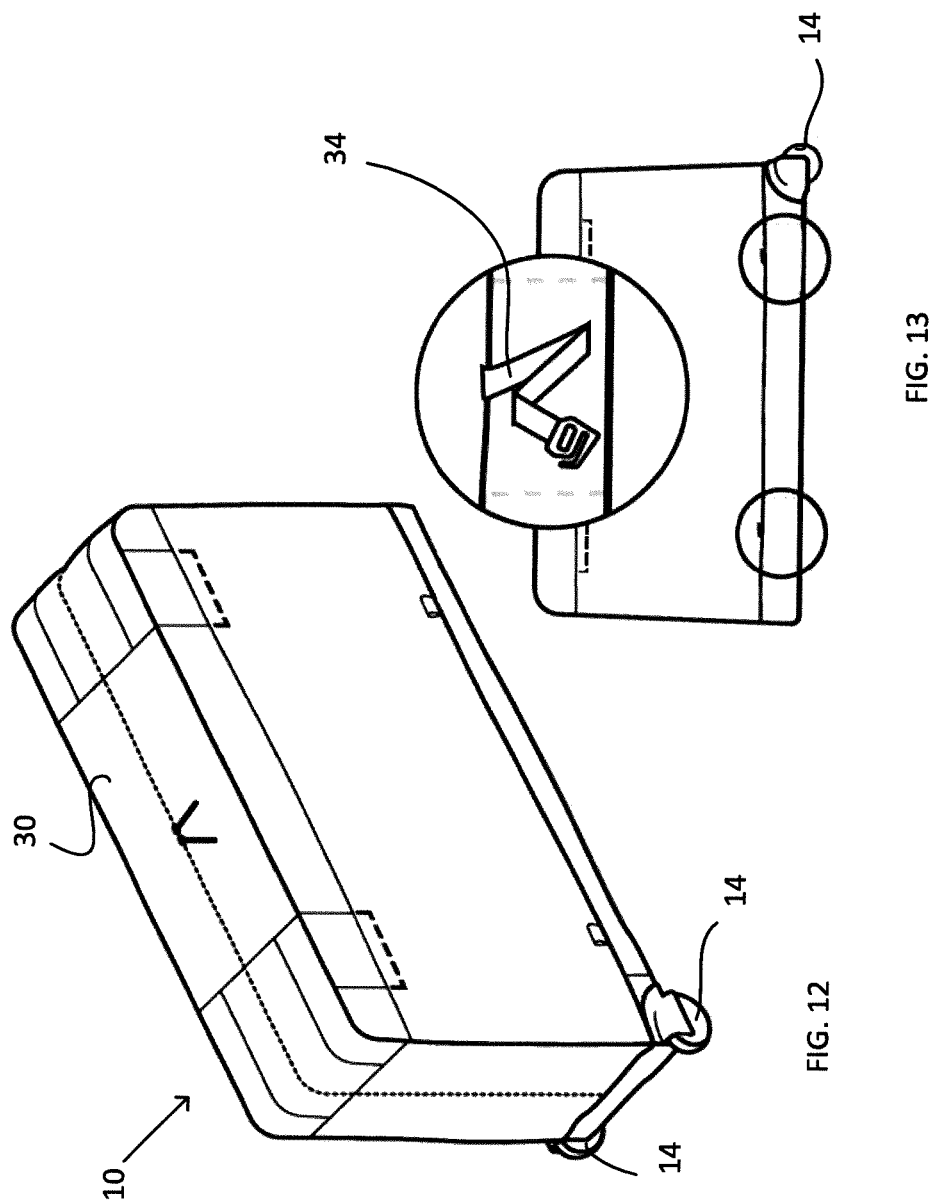

BAG FOR PROTECTION AND TRANSPORT OF BICYCLES

BACKGROUND

The disclosed embodiments relate to a bicycle bag for storage and transport of a bicycle. The bicycle bag comprises a protective frame which comprises a rigid longitudinal bottom frame, a substantially vertical front and rear frame extending upwards from the longitudinal ends of the bottom frame, and a detachable top frame extending between upper ends of the front and rear frame, the frame defining a protective cavity arranged to accommodate the bicycle, a bicycle support for fastening of the bicycle to the bottom frame, and a flexible cover configured to enclose the protective frame.

Today's bicycles and in particular bicycles used in races are more and more advanced and comprise sophisticated technical and sensitive or fragile equipment, such as gear equipment. Bicycles, especially when used in the professional racing sector, represent high price sports equipment.

The bicycles as such and especially certain parts of these bicycles, such as the brake system, the rear derailleur, brake handles and gear shifter/gear control etc., are known to be sensitive for mechanical handling and damages. This is particularly a risk during transport of bicycles, such as by airplane, train, or car, when the bicycle is exposed to mechanical forces and rough handling.

For a better protection during transport and in order to facilitate the handling and storage during transport, different types of bicycle bags have been developed.

WO2017/213515 discloses a collapsible bag having a rigid bottom and reinforced, foldable sidewalls for storage.

One disadvantage of many bicycles bags is that they are not robust enough to achieve a sufficient protection such as during handling and transport by plane. Another disadvantage of many bags is their weight. Hardcover bags usually have a higher degree of protection due to their stable outer shell, however have the disadvantage of being heavy and voluminous with little or no possibilities to compress/collapse them for storage when not in use.

The afforded space for storage of a bicycle bag, in particular of rigid bags is generally high. Rigid bags with a high protection are typically not compressible, meaning that large space is needed for storage when not in use.

Problems with many of the known compressible/collapsible bicycle bags are that they often have a low degree of protection and/or are complicated in use. Many bags are time consuming and complicated in use affording many steps by the user when collapsing them for storage or mounting them for use. Furthermore, many bicycle bags are not user friendly when it comes to entering the bicycle and fixing it in the bag for transport.

Thus, there is a need for an improved transport bag for bicycles, which overcomes one or more of the above-mentioned problems leading to a safe and efficient use for transport of bicycles.

SUMMARY

The inventive embodiments disclosed herein reduce the risk of causing damage to a bicycle or its fragile or vulnerable parts during storage or transport.

The disclosure also provides an improved transport container for bicycles which has a high protective level and at the same time being effective in use and space-efficient to store when not in use.

The disclosure also provides a protective bag that is easy to fabricate and simple in construction, the bag also being configured to facilitate quick mounting and dismounting, and being collapsible.

The disclosure also provides a bag which allows an easy, user friendly and not time-consuming placement and fixation of a bicycle inside the bag.

The disclosure also provides a protective bag which is light in weight and still has a high degree of protection of the bicycle.

The disclosure also provides a bag wherein the bicycle can be reliably and efficiently fixed during transport.

The disclosure also provides a protective bag suitable and adaptable for use with different types of bicycles, such as bicycles for track racing, road racing or mountain biking.

The disclosure also provides a transport container for bicycles solving one or more of the above-mentioned objectives and which is at the same time optimized in respect to the volume of the bag when in use and for later storage.

In a first aspect, a bicycle bag for storage and transport of a bicycle comprises:
- a protective frame which comprises a rigid longitudinal bottom frame, a substantially vertical front and rear frame extending upwards from the longitudinal ends of the bottom frame, and a detachable top frame (extending between upper ends of the front and rear frame, the frame defining a protective cavity arranged to accommodate the bicycle,
- at least one bicycle support for fastening of the bicycle to the bottom frame, and
- a flexible cover configured to enclose the protective frame.

The bag is characterized in that the vertical front and rear frame are hinged in their lower region, to be folded towards an opposite end of the bottom frame for collapsing of the bag. This bag has the advantage that the bicycle is safely enclosed and thus protected inside against mechanical forces when installed. The foldable front and rear frames allow to collapse the bag and to obtain a more or less flat assembly when a bicycle is not installed. The foldability is achieved by hinges inserted in the vertical frame parts or at the connection area between bottom frame and the vertical frame parts and such that the vertical rear and front frames do not have to be detached from the bottom frame when the bag is collapsed for storage. This allows a very effective mounting and demounting of the bag and overcomes more complicated bag constructions known form the prior art. At the same time, the bag can be light in weight due to its protective frame construction in combination with the cover which makes a hard cover or other more rigid constructions unnecessary to achieve a high degree of protection. The cover can be attached to the bottom frame or it may be loose. The bicycle support functions as fastening means to fix the bicycle to the bottom frame.

The hinges in the vertical frames at rear and front suitable for folding/compression are preferably in the lower region but can be arranged in a distance upwards from the bottom frame structure, thereby defining the height of the bag when compressed and allowing enough space to insert and store the demounted bag elements inside (e.g. top frame, bottom bracket, rear frame and front frame, parts of flexible cover etc.) when the bag is in a compressed stage.

The front frame, the rear frame, and the bottom frame can constitute one unit, meaning that the parts are not detachable from each other even when the bag is collapsed.

Preferably, each of the vertical front and rear frames comprise at least one hinge for folding.

The bicycle support comprises a bottom bracket support and/or a front fork support. The bottom bracket support and/or a front fork support are configured for supporting the bicycle frame at the bottom bracket and respectively at the front fork. These parts of the bicycle are typically rigid and robust, the front fork being located near the front end and the bottom bracket located near the rear end of the bicycle frame, are therefore suitable for providing a stable and robust support without risk of damage to the fragile parts.

The bottom bracket support and/or front fork support may in one embodiment be detachably arranged on the bottom frame. This is typically achieved by fastening means. Such fastening means may for example be clips or other preferably quick release fastener types. The advantage of having the bottom bracket support and/or front fork support detachable is that the bicycle frame may be installed and fastened to these elements prior to installing the bicycle inside the bicycle bag. This allows for an easier installation and fastening of the bicycle frame. Fastening of straps, clips or other small items, especially in the bottom region, may be inconvenient and difficult if performed when the bicycle is placed inside the bicycle bag, and access and visibility may be restricted and difficult in such cases. Preferably, the fixation of the bottom bracket support and/or front fork support to the bottom frame is flexible and/or stepless e.g. by standardized fastening means e.g. clips attachable in any position along the longitudinal rods of the bottom frame. This allows that different bicycles frame types as well as sizes can be placed and stabilized optimally within the bag.

The protective frame can comprise a number of sections providing shock absorbing characteristics to the frame. This allows the frame to withstand external forces, while still maintaining its shape when no external forces are applied. The bicycle bag may experience hits or be jammed in cluttered storage rooms, and such flexibility through the mentioned sections allows the bag frame structure to withstand such external forces without parts breaking or permanently bending.

In one embodiment, one or more of the sections are an integrated part of the rear and/or front frame. The sections may also be in other frame parts such as the the top or bottom frame. Preferably, the sections are made of a resilient material or a spring mechanism.

The flexible cover may be configured to firmly envelop the frame structure when mounted. Since the frame structure may define the outer borders of the bag, the flexible cover may be stretched around the frame structure, and additional supportive elements in the cover are not necessary for the bag to obtain its shape. This also contributes to reduced size of the bag, especially in collapsed state.

The flexible cover can comprises side sections, a front section, a back section and/or a top section having stiffening elements sewn into or otherwise attached to. Such stiffening elements may provide additional protection to the bicycle in case of hits from the outside or sharp objects hitting or pressing towards any of the sides of the frame structure of the bag. For example, bicycle wheels may be placed on each side inside the bicycle bag, and such stiffening elements may be provided on the side sections of the bag for protecting fragile parts on the wheels.

According to one embodiment, an upper part of the vertical front and/or rear frame are hinged and foldable outwards when the top frame is detached for easier installation of the bicycle into the bag.

Preferably, the vertical rear and front frame, after mounting to the bottom frame, are self-supporting. This is valid even when the top frame is not installed allowing for easy installation and fastening of the bicycle frame into the bag, before the top frame is installed.

The hinges in the vertical front and rear frame for folding/compression are preferably in the lower region but can be arranged in a distance upwards from the bottom frame structure, thereby defining the height of the bag when compressed and allowing enough space to insert and store the demounted bag elements inside (e.g. top frame, bottom bracket, rear frame, front frame, parts of flexible cover etc.) when compressed.

Preferably, the frame parts, i.e. the front frame, rear frame, bottom frame and top frame are each unified structures i.e. not made of a plurality of detachable pieces to be mounted together during mounting of the bag.

An upper part of the vertical front and/or rear frame may be foldable outwards, for easier installation of the bicycle into the bag.

The vertical rear and front frames may be self-supporting, without having a top frame attached, i.e. the vertical front and rear frames are self-supported when mounted in their upraised position due to their connection to the bottom frame structure. This ensures, that when the vertical frames are arranged on the bottom frame, the frames (rear and front) will be more or less vertical, creating the room for installing the bicycle and attaching of straps for fastening of the bicycle inside the bag with easy access.

The frame structure of the bicycle bag may be provided with straps or similar, for suspending a bicycle frame inside the frame while the bicycle at the same time may rest on the bottom bracket support and/or front fork support. Even though the bicycle rests on the bottom bracket support and the front fork support, suspending the bicycle in straps to the top and/or front and/or rear parts of the frame ensures that the bicycle does not move inside the bag and is kept more or less in the middle of the frame structure during all movements of the bag.

In another aspect a bicycle bag for storage and transport of a bicycle comprises:
- a protective frame which comprises a rigid longitudinal bottom frame, a substantially vertical front and rear frame extending upwards from the longitudinal ends of the bottom frame, and a detachable top frame extending between upper ends of the front and rear frame, the frame defining a protective cavity arranged to accommodate the bicycle,
- at least one bicycle support for fastening of the bicycle to the bottom frame, and
- a flexible cover configured to enclose the protective frame.

The bag is characterized in that an upper part of the vertical front and/or rear frame are hinged and foldable outwards when the top frame is detached for easier installation of the bicycle into the bag.

In a further aspect, a bicycle bag for storage and transport of a bicycle comprises:
- a protective frame which comprises a rigid longitudinal bottom frame, a substantially vertical front and rear frame extending upwards from the longitudinal ends of the bottom frame, and a detachable top frame extending between upper ends of the front and rear frame, the frame defining a protective cavity arranged to accommodate the bicycle,
- at least one bicycle support for fastening of the bicycle to the bottom frame, and
- a flexible cover configured to enclose the protective frame. The bag is characterized in that the vertical rear and front frame, after mounting to the bottom frame, are self-supporting. This applies also when the top frame is detached.

In yet a further aspect, a bicycle bag for storage and transport of a bicycle comprises:
- a protective frame which comprises a rigid longitudinal bottom frame, a substantially vertical front and rear frame extending upwards from the longitudinal ends of the bottom frame, and a top frame extending between upper ends of the front and rear frame, the frame defining a protective cavity arranged to accommodate the bicycle,
- at least one bicycle support for fastening of the bicycle to the bottom frame, and
- a flexible cover configured to enclose the protective frame. The bag is characterized in that the protective frame comprises a number of sections providing shock-absorbing characteristics to the frame.

The front frame, the rear frame, and the bottom frame can constitute one unit. This means that they are not detached from each other during normal use (mounted and collapsed stage of the bag).

The vertical front and rear frame can be hinged in their lower region, to be folded towards an opposite end of the bottom frame for collapsing of the bag.

The bicycle support can comprise a bottom bracket support and/or a front fork support. The bottom bracket support and/or front fork support can be detachable arranged on the bottom frame. The flexible cover can comprise side sections, a front section, a back section and/or a top section having stiffening elements sewn into or otherwise attached to. The protective frame can comprise a number of sections providing shock absorbing characteristics to the frame. Preferably, one or more of the sections are an integrated part of the rear and/or front frame. The sections can be made of a resilient material or a spring mechanism.

An upper part of the vertical front and/or rear frame can be hinged and foldable outwards when the top frame is detached for easier installation of the bicycle into the bag. The vertical rear and front frame after mounting to the bottom frame, can be self-supporting.

Each of the vertical rear and front frames can be provided with at least one hinge for folding inwards and/or outwards.

The term "rigid" is used herein to describe characteristics of a structure that is stiff or does not bend or deform easily, considering relevant loads for the application of the inventive embodiments, so that the structure referred to may be used as a supporting element.

BRIEF DESCRIPTION OF THE DRAWINGS

Embodiments of the present invention will now be described, by way of examples only, with reference to the following diagrams wherein:

FIG. 12 shows schematically in a perspective view a bicycle bag in mounted state and with the flexible cover closed; and FIG. 13 shows schematically from a side view a bicycle bag in mounted state and with the flexible cover closed together with an enlarged detail view of pockets for storing straps on the outside of the bag.

DETAILED DESCRIPTION

The following description of the exemplary embodiment refers to the accompanying drawings. The same reference numbers in different drawings identify the same or similar elements. The following detailed description does not limit the invention. The following embodiments are discussed, for simplicity, with regards to various forms of protective means used in connection with one type of bicycle frame. It should be appreciated, however, that the referenced protective devices and systems are also applicable and suitable for use in respect to other type of bicycles, requiring protection during storage and transport. Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment.

In the description relative terms such as front, back, rear, top, bottom, side, left, right, vertical, horizontal, lower, upper etc. are all related to the bicycle when placed in upright position in the bag and seen in the normal direction of riding. Furthermore in the following description, certain elements and parts may only be exemplified and described for one sidewall of the bag and/or or side of a bicycle. Even though only exemplified for one side, it is to be understood that the features may correspondently also apply for the opposite side of the bag and/or bicycle.

Figure 1:
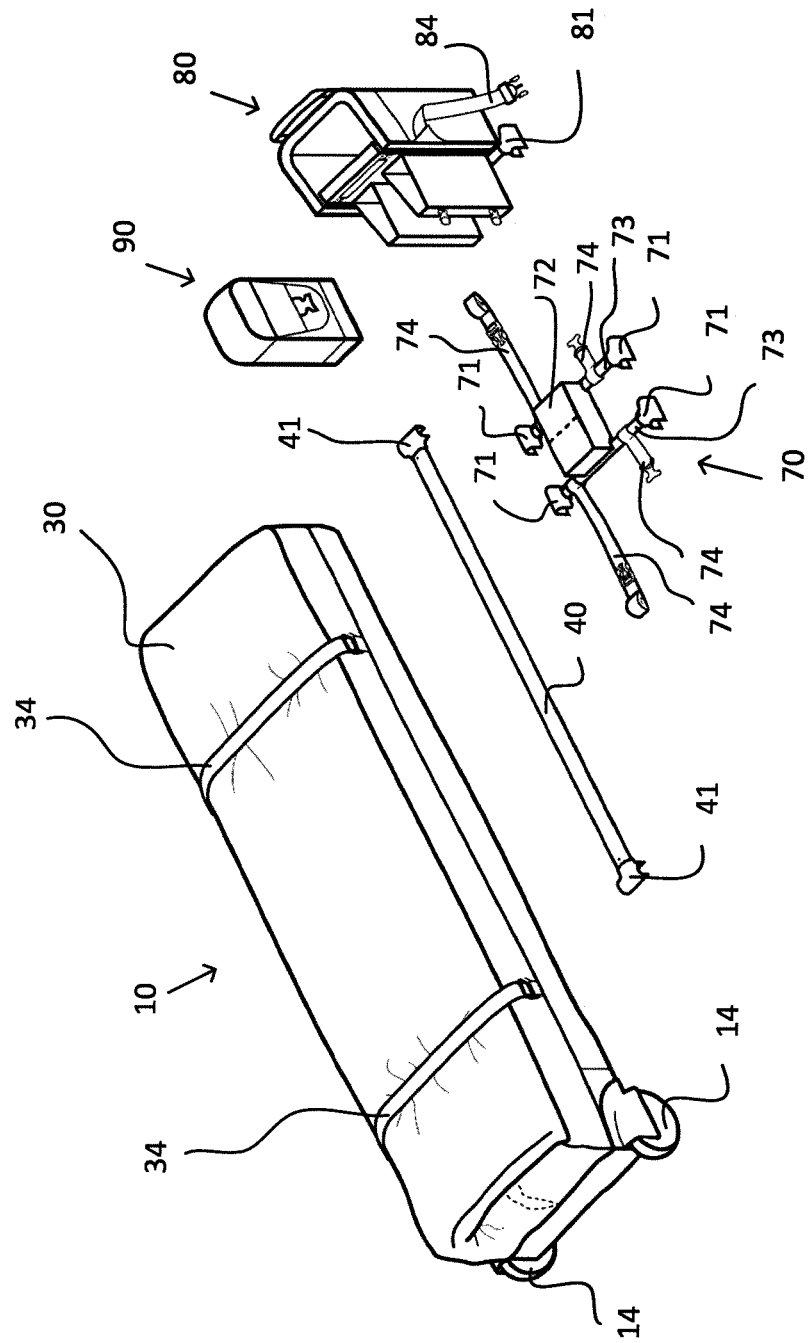
FIG. 1 shows schematically in a perspective view the main components of the disclosed bicycle bag, and where the bag is closed and in a collapsed/compressed state.

FIG. 1 shows schematically in a perspective view the main components of the bicycle bag 10, and where the bag 10 is closed and in a collapsed state. The size of the bag 10 is considerably reduced compared to when a bicycle is installed. A top frame 40, a bottom bracket support 70, a handlebar holder 90, and a front fork support 80 are shown separately as these are typically but not necessarily, loose or detachable elements of the bag 10. These additional elements are shown outside the collapsed bag for illustrative reasons but maybe stored inside in the collapsed stage of the bag 10. A flexible cover 30 encloses the internal parts of the bag, such as a bottom frame, and is tightened with a number of straps 34. Preferably, the bag comprises wheels 14 for easy transportation that can be arranged as shown at the rear end and possibly also or instead at the front end. The bicycle, preferably with the bicycle frame 100, is fastened to the bottom frame 20 of the bag 10 by suitable fastening means, preferably in form of at least one bicycle support for fastening. In FIG. 1 the shown bicycles supports are a bottom bracket support 70 and a front fork support 80 intended to be fastened to the bicycle's bottom bracket 170 and front fork 130, respectively. Thus that the two parts can be easily mounted on to the bottom frame 20 of the bag (not shown in FIG. 1) by clips (71, 81) or other suitable fastening organs. A more detailed description of the parts shown in FIG. 1 will follow in the description of the following figures. The bag 10 may typically be equipped with one or more handles (not shown) on the top, front or backside for lifting and dragging during transport both in the collapsed and mounted stage.

Figure 2:
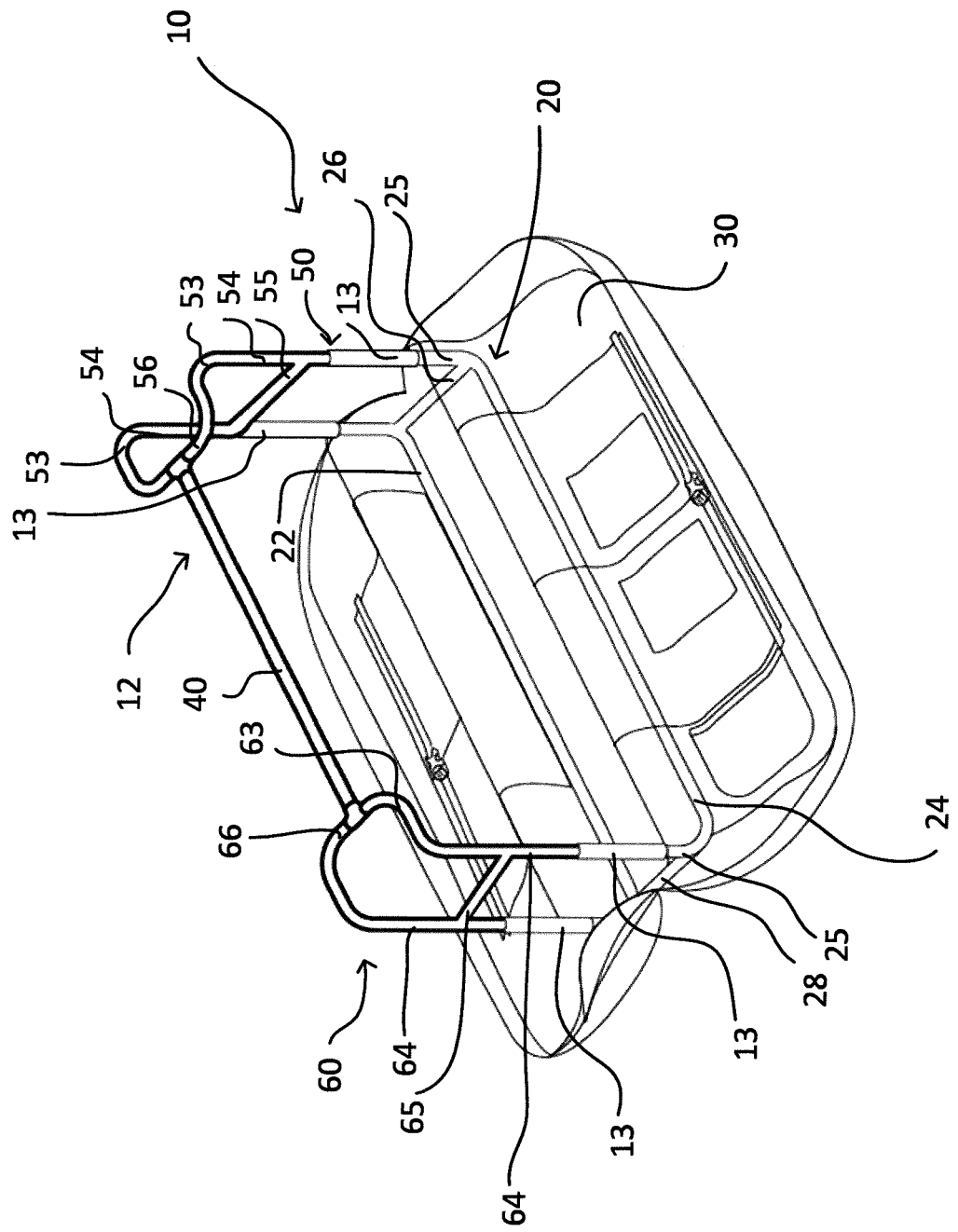
FIG. 2 shows schematically in a perspective view a mounted protective frame of a bicycle bag with a flexible cover in opened state.

FIG. 2 shows schematically a bicycle bag 10 with a flexible cover 30 in opened state and with a protective, reinforcing frame 12 inside in a mounted stage. The frame 12 has the function to protect the bicycle whereby the bicycle is to be placed inside the frame and fixed to it. The bicycle is preferably installed in upright position in the bag. The protective frame 12 thereby creates a protective cavity. Furthermore, the frame 12 has the function to reinforce the bag 10 and may in a preferred embodiment at the same time define the outer shape and border of the bag when covered by the flexible cover 30 in the closed stage. The frame comprises a bottom frame 20, a vertical support being a front frame 50, a further vertical support being a vertical rear frame 60, and a top frame 40. The bottom frame 20 is on a flexible cover 30 made of a durable fabric such as nylon, polyester, a woven or non-woven cloth or combinations of different materials. The cover can be attached to the bottom frame or loose. The bottom part of the cover 30, below the bottom frame 20 and the lower side parts, may be reinforced with a hard plastic or similar that contributes to a stable, durable bottom part of the bag, and that may also provide additional protection from water and dirt. The frame parts 20, 40, 50, and 60 are mounted into a frame structure 12 intended to enclose and support a bicycle frame 100 during storage and transport. The frame parts 20, 40, 50 and 60 are preferably made of a stiff material with light weight, such as aluminium or composite. The bottom frame 20 is preferably configured to be stable/rigid so that the bag will be steady and self-supporting during mounting or dismounting the bicycle inside the bag 10 and when the bicycle is mounted inside for storage or transportation. In the shown embodiment, the bottom frame 20 comprises two horizontal and parallel longitudinal rods 22, 24 extending longitudinally from the rear to the front side of the bag and thereby forming an elongated bottom frame 20. In the shown embodiment the two horizontal longitudinal rods 22, 24 are connected by two transverse rods 26, 28 close to the rear and front end of the bottom frame 20. In another embodiment, the bottom frame 20 may comprise a different structure, such as for example diagonal rods between the two longitudinal rods, more than two longitudinal and/or transverse extending rods, or only one longitudinal central rod supported by a stiff bottom plate or by on each side extending transversal extending cross bars. The purpose of the bottom frame is to provide a stable base for mounting and attaching the bicycle and to be a part of a supporting enclosure for the bicycle, and hence there are a large number of structures that can be used for this purpose. Furthermore, the bottom frame 20 contributes to a defined constant outer shape and dimensions of the bag together with the other parts of the frame 12 and the cover 30. It is desirable that the bag is light weight, provides rigid support surfaces, and is robust. Material selection for the frame parts, cover, and other parts may contribute to obtaining these objectives. The vertical front and rear frames 50, 60 provide the outer ends of the frame enclosing the bicycle. For illustrative reasons a differentiation is made between the vertical front and rear frame 50, 60. Using a symmetrical design of the bag and particularly of the frame 12 will principally allow that the bicycle can be mounted either way inside the bag meaning that the vertical rear frame (support) 60 may correspondingly serve as vertical front frame (support) 50 in relation to the enclosed bicycle and visa versa.

In the embodiment of FIG. 2, the vertical rear and front frames 50, 60 each comprise two parallel rod sections 54, 64 arranged substantially vertically from each of the front, respectively rear ends of the bottom frame 20. The two parallel rod sections in front and at the rear end of the bag are fixated by a number of transverse rods 55, 56, 66. As with the bottom structure, the vertical supports may be constructed differently and their number may exceed two rods. The purpose of the vertical supports is to provide a front and rear part of the frame enclosing the bicycle and protecting the bicycle from external forces such as a hit or a fall towards the ground. By constructing the vertical supports with at least two parallel rods 54 in front, and at least two parallel rods 64 at the rear, a "safe room" or cavity for the bicycle is created without the need for additional supporting/protective features in the cover 30. There is no need for a hard or reinforced cover since the flexible cover can be stretched over the outer frame, which not only reinforces the bag but also provides for a stable form of the bag such that the bag is self-supported in upright position. Each of the vertical frames/supports in front and at the rear may also only comprise one rod, typically being a central rod with a number of transversally/horizontally extending bars on each side for protection and shaping of the bag.

The vertical front and rear frames are arranged and constructed such that they are self-supporting in their vertical orientation after being mounted to the bottom frame even if the top frame 40 is not attached to them yet. This allows an easy insertion of the bicycle into the bag 10. The self-supporting of the vertical frame parts can be achieved by different means such as that the rods of the frames are inserted into vertically extending guiding sleeves or holes in the bottom frame structure or into guiding sleeves extending from the bottom frame structure such as the lower vertical rod parts 25.

Preferably, the front frame 50, the rear frame 60, and the bottom frame 20 constitute one unit, meaning that these frame parts are not supposed to be detachable from each other even when the bag is in the collapsed stage. This allows an easier mounting for the user as it is not necessary to identify the different frame parts for mounting. The folding of the frame is achieved by different hinging structures as described in more detail below. This allows to collapse the bag for storage although the mentioned frame parts still being attached to each other.

The top section of the vertical rear and front frames 50, 60 is in the shown embodiment curved (see curved elements 53) towards the centre of the elongated bag and the ends of each rod meet to form a transverse rod 56, 66 at their upper end. The top frame 40 in the shown embodiment comprises one, preferably removable longitudinal rod extending from the vertical rear frame 60 to the vertical front frame 50 and is attached to the transverse end sections 56, 66 of each of the vertical frames by suitable fastenings elements 41 such as clips. The top frame 40 being removable allows an easier introduction of the bicycle into the inner side of the frame and bag. It also allows the frame to be collapsed. The skilled person would understand that the top frame 40 can be formed in different ways such as with more than one rod, a plate etc. With the top frame 40 installed, a four-sided protection frame 12 is created suitable for enclosing a bicycle 100. The protection frame 12 is typically made self supporting and stable.

In order to prevent the frame from unintentionally deforming or braking as a result from external forces from for example hits or a fall towards the ground, the frame 12 may be provided with regions with built-in flexibility intended to be shock-absorbing. A preferable region to implement such flexible sections may be in the front and/or rear vertical supports (50, 60), preferably in the lower region or in the corner region. Such flexibility may be provided by using materials with inherent resilient properties, such as Medium-density polyethylene (MDPE). Alternatively, the flexibility may be achieved by substituting the rigid rods in this area by a spring mechanism, such as a compression spring. In the shown embodiment, this flexibility/shock absorbing may be provided in a flexible section 13 in the vicinity of the attachment area between the bottom frame 20 and the vertical supports 50, 60. If flexibility is added in this area, a force pushing on either of the vertical supports 50, 60 more or less horizontally from any side and/or vertically from the top, will result in a slight bend in the direction of the force, and due to the elasticity, the frame will come back to its original shape afterwards.

A flexible cover 30 having a shape corresponding to the shape of the frame 12 of the bag can be wrapped tightly/stretched over the frame. The cover 30 can for example comprise two side sections connected to form a bottom section, and with a rim with closing means, such as a zipper, so that each side section can cover a side of the frame and the rim on each side meets at the top, front and back for closing the zipper. The cover 30 does not need any supporting structures as it will be tensioned by the frame 12, however it may be provided with reinforcements in some areas for additional protection or for obtaining a stiffer case enclosing the bicycle 100. For example, if the vertical supports/frames 50, 60 only comprises one vertical rod, the cover may be provided with supportive elements, such as a more or less stiff padding or a panel attached to or sewn into the cover 30. The cover 30 may also be provided with stiffening elements in the side section of the cover, for protecting the bicycle wheels or parts of the wheels, or other fragile parts which may be placed in this area and not protected by the frame 12. Such stiffening elements may for example be plastic panels sewn into the cover or placed inside the cover in the side sections of the bag 10. The cover 30 may further comprise internal or external pockets 31 for pedals, wheels, and other loose equipment.

Figure 3:
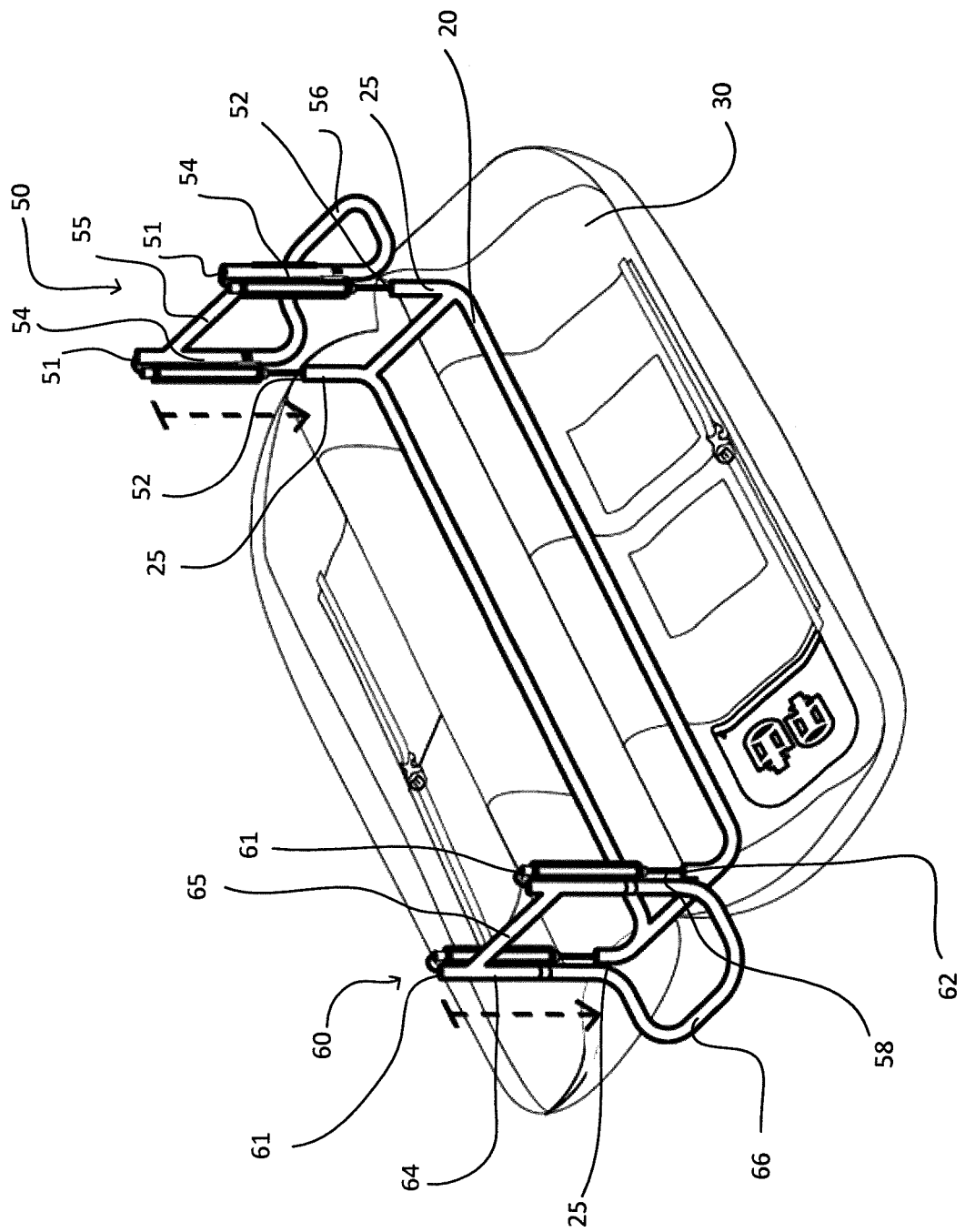
FIG. 3 shows schematically in a perspective view a protective frame of a bicycle bag with a flexible cover in opened state and with parts of the frame folded out and the top part of the frame removed, whereby the down arrows indicate the down folding of the vertical supports.

FIG. 3 shows schematically a bottom frame 20 mounted inside an open flexible cover 30 of a bicycle bag 10. The vertical rear and front frames 50, 60 are folded outwards at upper joints/hinges 51,61 in order to allow for easy placement of the bicycle frame inside the bag 10. It is not a requirement to be able to fold the vertical frame, however it is an preferred embodiment as it will ease installation of the bicycle inside the bag 10 when foldable outward, and it also allows for folding the bag 10 flat when not in use by folding the vertical frame parts towards the opposite ends of the bottom frame. In this shown embodiment, each vertical rear and front frame is hinged twice along its lengths and may be folded twice at the upper joint/hinge 51,61 and a lower joint/hinge 52,62 on each vertical frame 50,60. The upper hinge 51, 61 provides a larger opening for placing the bicycle frame 100 inside the bag, when folded outwardly, while the lower hinge 52, 62 ensures that the frame may be folded downwards to achieve a substantially flat structure of the bag 10. If the vertical supports 50, 60 are shaped with an inwards curved section at the top, as shown in FIG. 3, this feature is especially advantageous as the curved section would be an obstacle when placing the bicycle frame inside the bag, and when folding the bag flat. The folding outward and inward may also be achieved by matters of the same hinge allowing to bend or fold the vertical frame in front and at the rear either outward or inward.

One preferred hinge type for providing this folding option is to use a corresponding principle as known from tent poles, and as shown in FIG. 3. Each section to be folded is a hollow tube, and a continuous elastic cord 58 (shock cord) is run through each section and fastened in the first and last section to be folded. The sections are provided with inserts allowing the different sections to be inserted into each other and connected to each other. One section may then be pulled out from an adjoining section and folded, while the elastic cord maintains a connection between the parts. By using such a principle, a very user-friendly mounting process is achieved, as each part to be mounted will be in its correct place, and it is not possible to put the wrong pieces together. Other known hinge solutions may also be used. In other embodiments, the vertical posts may comprise several tube sections that can be dismounted to separate parts and laid inside the bag for a collapsed bicycle bag.

The lower hinges 52, 62 of the vertical rear and front frames 50, 60 are preferably arranged in the lower section of the vertical frame parts in a distance upwards from the bottom frame 20. When folding the vertical supports inwards at these lower hinges, the remaining lower vertical parts 25 below the lower hinge(s) of the vertical front and rear frame will define the vertical extension of the bag in its collapsed/compressed stage (i.e. corresponding to the distance of the lower hinges to the bottom frame 20). This distance of the lower hinges from the bottom frame, i.e. the vertical extension of the collapsed bag is typically chosen such that it creates a space in the collapsed bag that is suitable and sufficient to accommodate the other parts of the bag inside for storage such as the foldable vertical frames including the potentially curved top parts, the detached top frame, the bottom bracket support and fork support, those parts of the cover not used to enveloped the collapsed bag etc. The flexible cover 30 can then be used to envelope the compressed bag as shown in FIG. 1, while the remaining parts of the cover 30 not used to envelope the collapsed/compressed bag are folded/rolled inside the collapsed bag.

Figure 4:
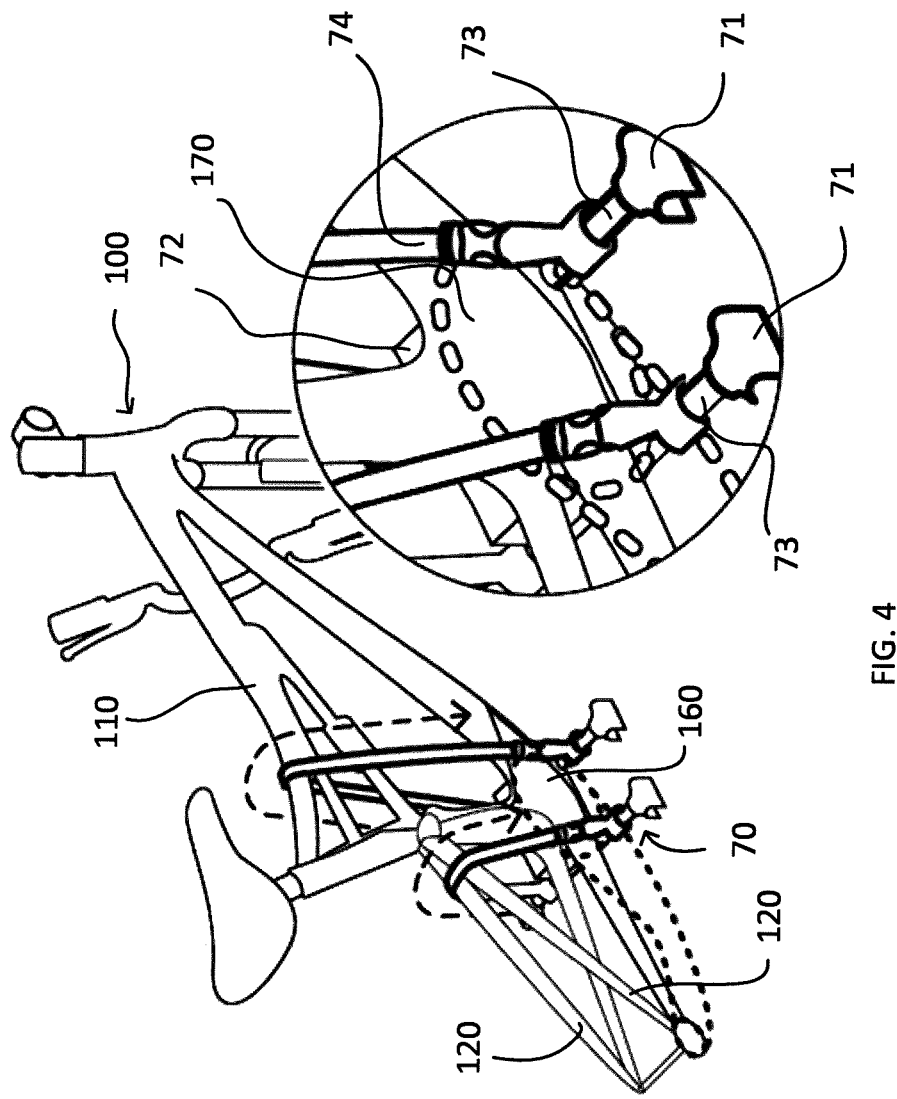
FIG. 4 shows schematically in a perspective view a bicycle mounted to a bottom bracket support of the bag with an enlarged detail view of the bottom bracket support, whereby the arrows in the overview figure indicate the placement and orientation of straps for fixating of the bicycle to the bottom bracket support.

FIG. 4 shows schematically a bicycle frame 100 mounted to the preferably removable bottom bracket support 70 with an enlarged detail view of the bottom bracket support 70. The bicycle wheels and the handlebar are preferably removed from the frame before mounting the bicycle frame 100 to the support 70. The bottom bracket 170 of the bicycle is resting on a cushion 72 attached to two cross bars 73 with fastening means in form of clips at each of their ends. Other known fastening means of the bottom bracket support to the bottom frame may be used instead such as hook and loop fasteners on straps, straps with metal or plastic cam buckles, magnetic fasteners or similar. The cushion 72 is typically made of a shock-absorbing and pressure-absorbing material such as variants of plastics, rubber sponge or similar, providing a dampening effect of the bicycle frame 100 to the bottom bracket support 70. The cushion 72 may be provided in different heights for adjusting the angle of the bicycle frame 100 relative to the bottom frame 20. The bottom bracket support is intended to be fastened both to the bicycle frame 100 and to the bottom frame 20 of the bicycle bag, and therefore has clips 71 for easy and stepless installation/fixation to the bottom frame 20 of the bicycle bag and straps 74 for strapping around a part of the bicycle frame 100. It is preferred that the bottom bracket support 70 is stable when placed on the floor so that the bicycle frame 100 can stand self-supporting without additional support on a plane floor during the mounting process.

Two straps 74 are provided for fastening the bottom bracket support 70 to the bicycle, one typically extending over the seat stays 120, and one typically extending over the top tube 110 (indicated by arrows). The straps 74 are fastened to rigid elements of the bicycle frame 100 and the bottom bracket support 70, thereby allowing the straps to be tightened firmly without risking wear or damage to fastening points or fastening elements. The exact placement of the straps to the bicycle may be selected by the user, and may depend on the type and size of the bicycle, however using the seat stays 120 and the top tube 110, makes the fastening easy and firm and without risk of damaging fragile parts, as these elements are typically rigid and robust parts of the bicycle frame 100. The straps 74 may be fastened and tightened by conventional clip-on buckles with length adjustment means. By using two sets of straps, as in the embodiment shown in FIG. 4, a stable assembly of the bicycle frame 100 to the bottom bracket support 70 can be obtained. It would however be possible to attach the bicycle only with one strap, or more straps if found convenient. Other types of locking systems may used such as hook and loop fasteners, metal or plastic cam buckles, or similar. The bottom bracket support 70 is preferably removable to allow an easier dismounting of the bicycle and compression of the bag 10 when not in use.

Figure 5:
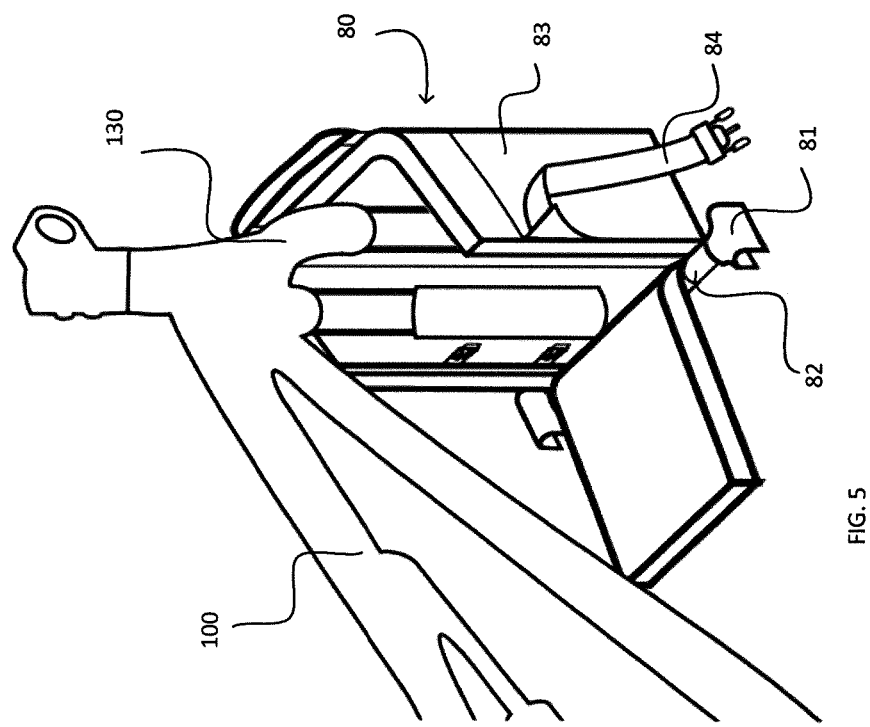
FIG. 5 shows schematically in a perspective view a front part of a bicycle with the wheel removed and the front fork mounted in a front fork protective support of the bag.

FIG. 5 shows schematically in a perspective view a front part of a bicycle frame 100 with the front wheel removed and the front fork 130 mounted in a protective front fork support 80. The two stems of the front fork are mounted in a fork protector 83 comprising padded walls and bottom covering/enclosing the stems of the fork. The padded fork protector is attached to a front fork support frame in form of a cross bar 82 with fastening means 81 in form of clips at each end for attaching to another frame of the bicycle bag, such as the bottom frame 20. The support frame comprises at least one cross bar 82 arranged transverse the bicycle frame 100 for fixation to the bag frame 20. Preferably, the fastenings means (e.g. clips) 71 and 81 on each side of the bottom bracket support 70, respectively front fork support 80 are identical in shape, principally allowing mounting of the bracket support 70 to the bottom frame in both directions. Other known fastening means of the bottom bracket support and front fork support to the bottom frame may be used instead of the shown clips such as hook and loop fasteners, straps with metal or plastic cam buckles, magnetic fasteners or similar.

Figure 6:
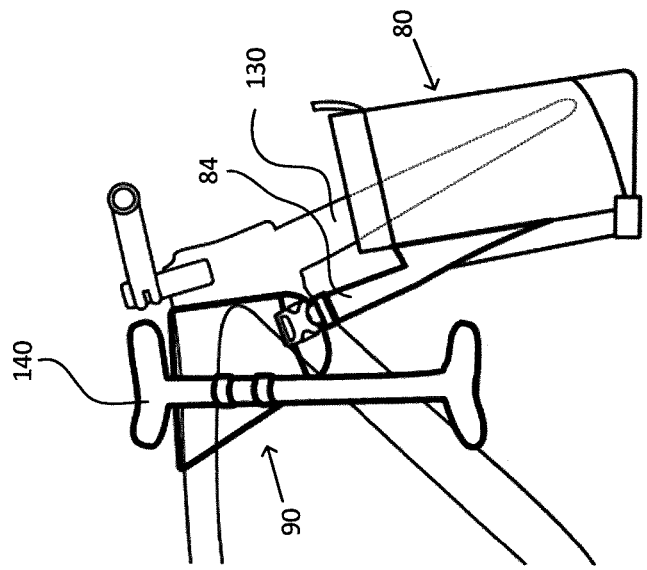
FIG. 6 shows schematically an embodiment in a side view of a front part of a bicycle wherein the front wheel is removed and the front fork is mounted in a front fork support and with the handlebar removed and placed in a handlebar holder.

FIG. 6 shows schematically from a side view a front part of a bicycle frame 100 with the front wheel removed and the front fork mounted in a front fork support 80 and with the handlebar 140 removed and placed in a handlebar holder 90. The handlebar holder 90 in this embodiment is intended for use with handlebars with a more or less straight bar, such as typically used for mountain bikes, trekking bicycles, or off-road bicycles. The handle bar is placed near vertically, with one end located in a padded pocket 85 attached to the front fork support 80. The other end is inserted into a pocket in the handlebar holder 90, which is laid over the top tube 110 of the bicycle frame 100. Straps 84 connects the handlebar holder to the front fork support, and by tensioning these straps, the handle bar is stabilized and fixated to the assembly. This pull effect on the front fork support 80 also ensures that the front fork support 80 is tightly fixated to the front fork 130 of the bicycle frame 100. As with the bottom bracket support 70, the straps are preferably attached to rigid and robust elements of the bicycle frame.

Figure 7:
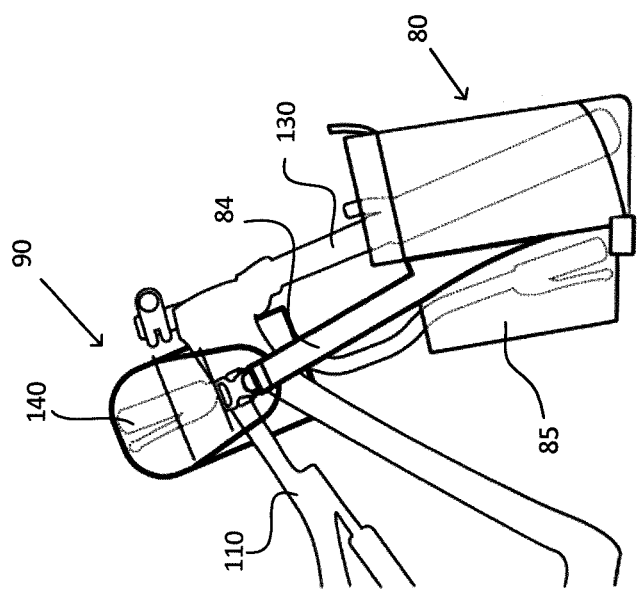
FIG. 7 shows schematically another embodiment in a side view of a front part of a bicycle wherein the front wheel is removed and the front fork is mounted in a front fork support and with the handlebar removed and placed in a handlebar holder for a different type of handlebar e.g. a racing bicycle handlebar.

FIG. 7 shows schematically another embodiment of the handlebar holder 90 for use with handlebars with a curved shape, such as bullhorn type, drop bars or similar, such as typical for road racing bicycles. The principle used is similar as described for FIG. 6 above, pulling the front fork support 80 and handlebar holder 90 towards each other, both being attached to rigid elements on the bicycle frame, thereby ensuring that the front fork 130 is securely fixed inside the front fork support 80. However, in this embodiment, the handle bar is not being tensioned together with the handle bar holder, but is loosely attached to the handle bar holder i.e. by suitable fastening means such as straps, clips or the like.

Figure 8:
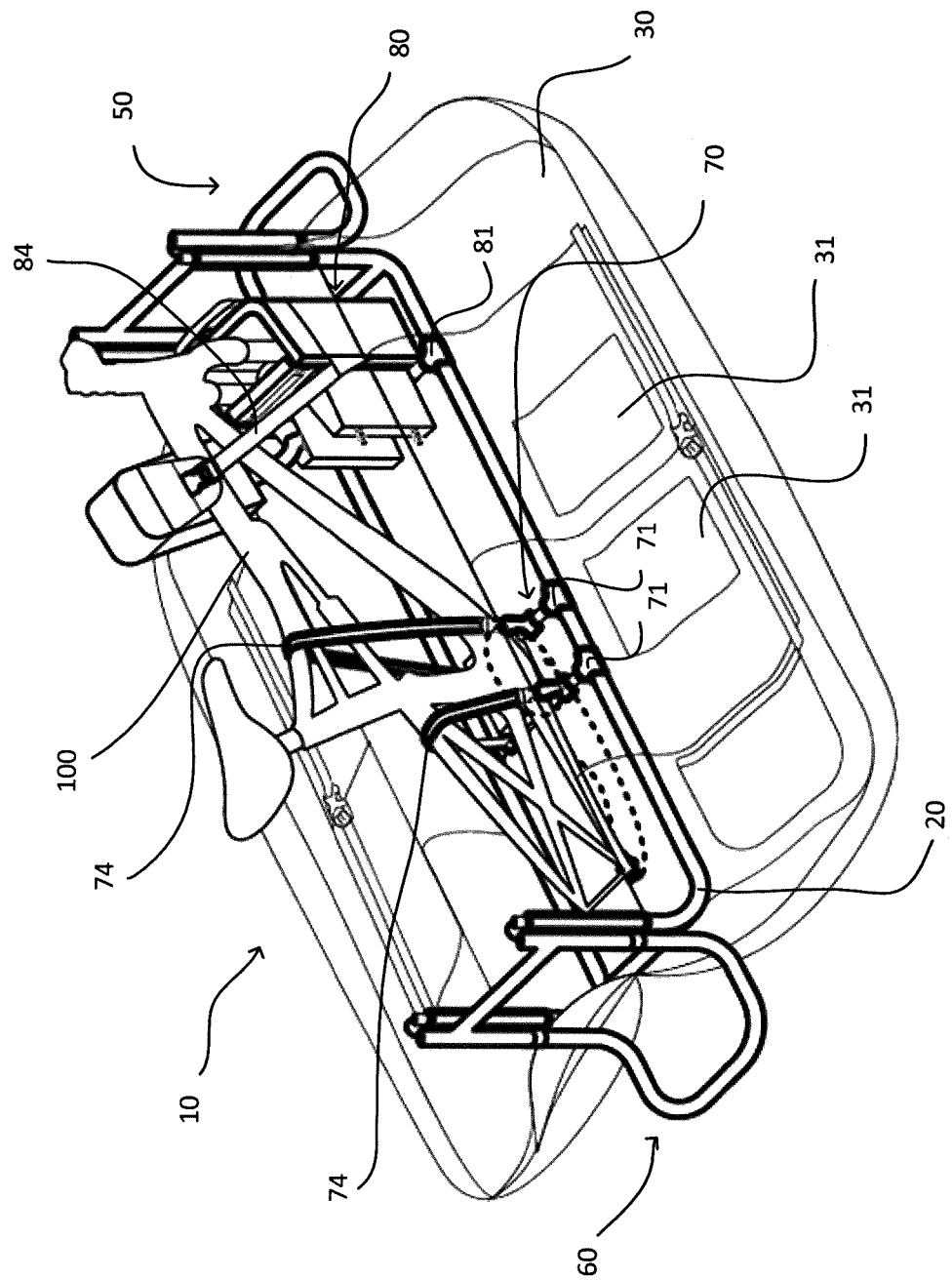
FIG. 8 shows schematically in a perspective view a protective frame of a bicycle bag with a flexible cover in opened state and with parts of the vertical frames folded out and with a bicycle frame mounted into the frame.

With both the bottom bracket support 70 and the front fork support 80 firmly attached to the bicycle frame 100, the assembly is ready to be mounted inside the bicycle bag 10. FIG. 8 shows schematically a bottom frame 20 mounted inside an open flexible cover 30 of a bicycle bag 10 and with the vertical frames 50, 60 folded out, similar to FIG. 3. A bicycle frame 100, attached and firmly fastened to a bottom bracket support 70 and a front fork support 80, is installed into the bottom frame 20 by use of the fastening means 71, 81 in the form of clips at each end of cross bars traversing between the horizontal rods of the bottom frame. Only the top part of the bicycle frame now extends outside the framework of the bicycle bag, due to the vertical rear and front frame 50,60 being folded outwards, and the top frame 40 not yet installed.

Figure 9:
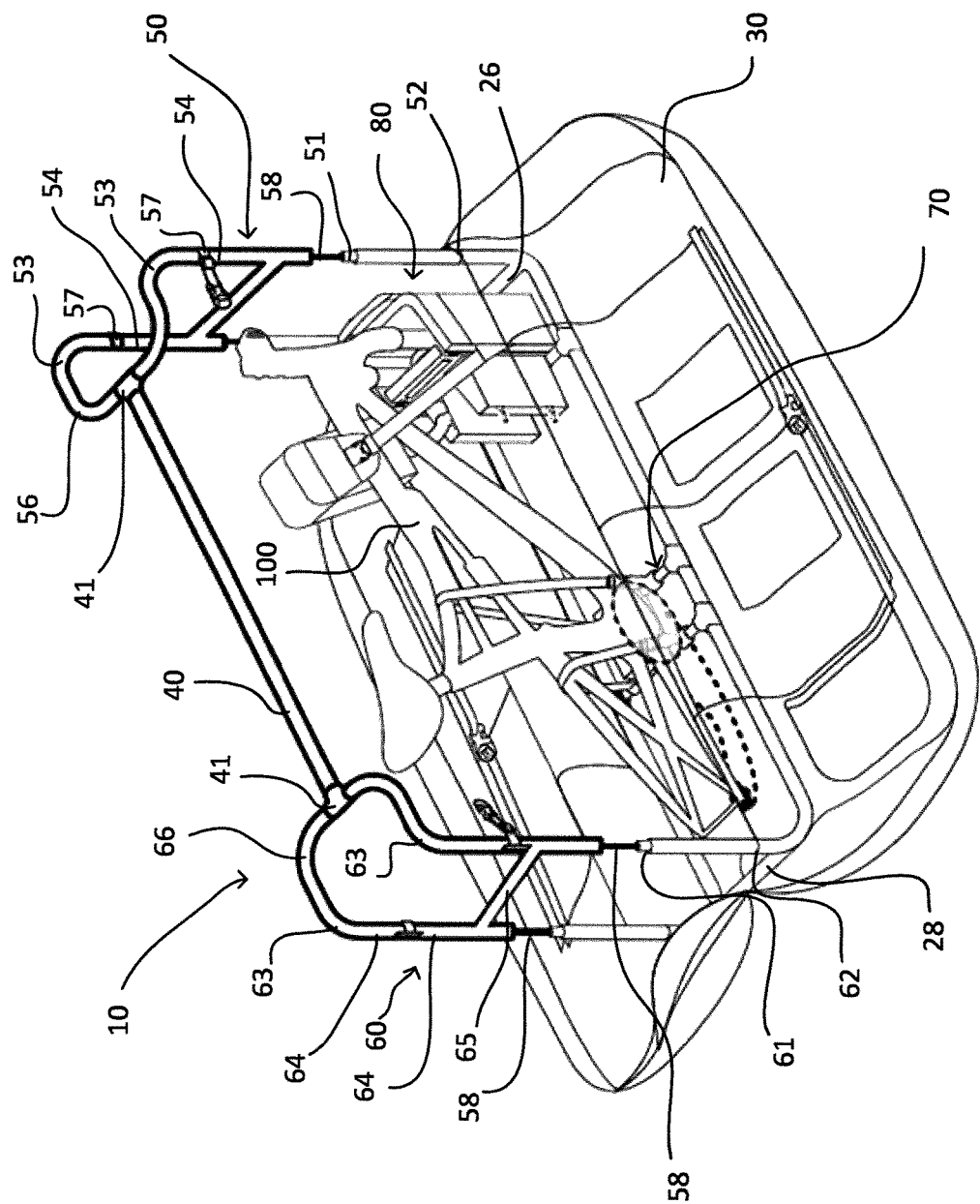
FIG. 9 shows schematically in a perspective view a protective frame of a bicycle bag with a flexible cover in opened state, the upper part of the frame being installed, the upper hinges not yet in their final mounted position and with a bicycle frame mounted into the frame.

FIG. 9 shows schematically the vertical front and rear frame being folded into position and with a top frame 40 attached to each of the vertical frames 50, 60 by use of fastening organs such as the shown clips 41. The lower hinges 52, 62 are mounted and the upper hinges 51, 61, are lifted into correct position, and not yet mounted, and the elastic cord 58 inside the vertical supports is therefore in a stretched condition. The frame now has its four-sided near rectangular shape surrounding the entire bicycle frame 100, and once the upper hinges 51, 61 are mounted, the frame 12 will have four stiff side sections protecting the bicycle 100.

Figure 10:
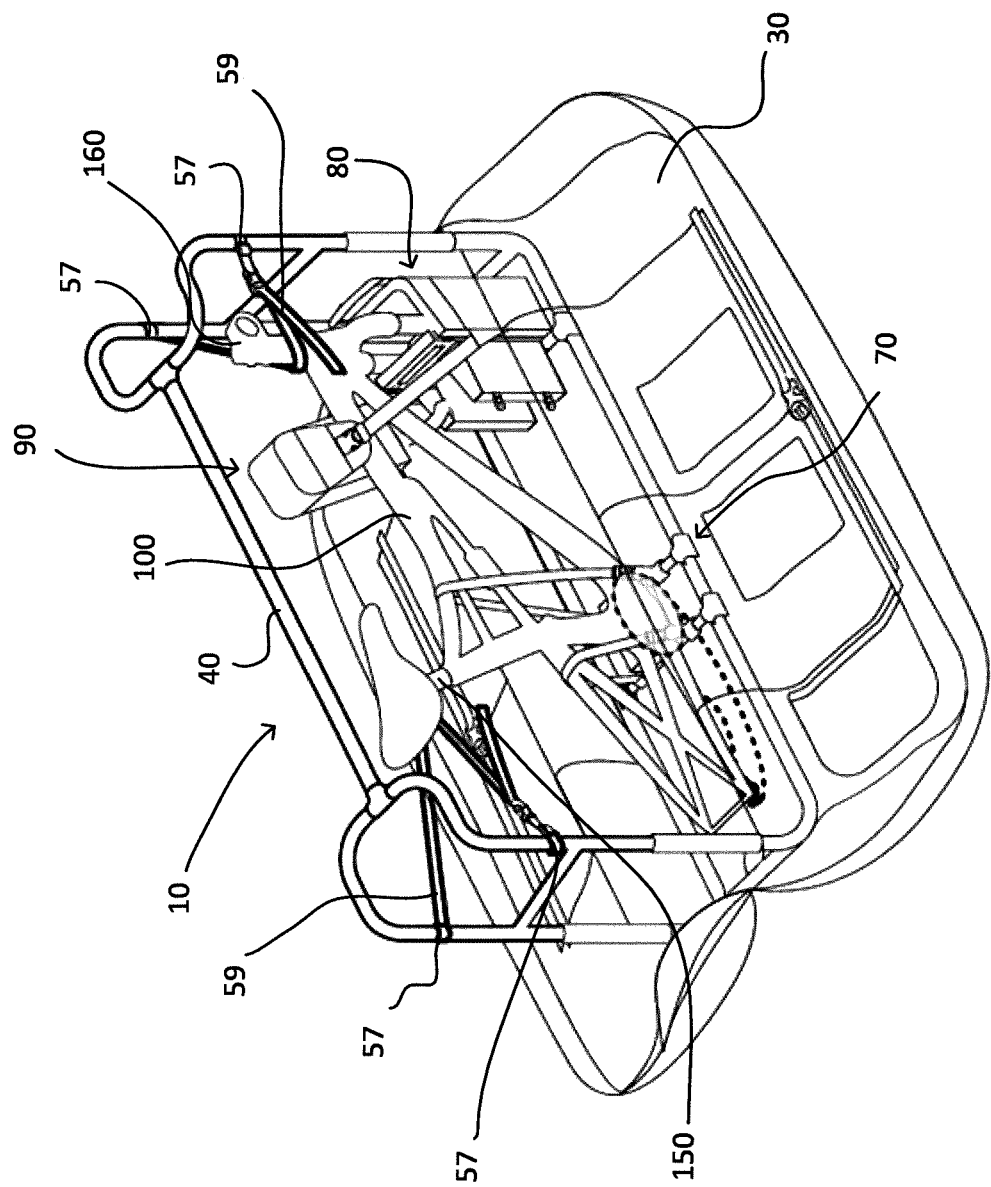
FIG. 10 shows schematically in a perspective view a frame of a bicycle bag with a flexible cover in opened state and the frame in mounted state and with a bicycle frame mounted into the frame and strapped to the frame.

Fastening points 57, such as buckles, are provided on the vertical supports, and are intended for providing a point for fastening straps to the bicycle frame as shown in detail in FIG. 10.

FIG. 10 shows the final stage of the process of mounting the bicycle frame 100 into the bicycle bag 10. The frame 12 is mounted and creates a "safe room" (protective cavity) for the bicycle, where no parts of the bicycle protrude outside the framework of frame 12. Fastening straps 59, are fastened to fastening points 57 on the vertical frames in the front and rear end, and stretched around the upper part of the seat tube 150 and the handlebar stem or head tube 160, respectively. As with the other straps 74, 84 the straps can be mounted to other parts of the bicycle frame 100, however they should be mounted to rigid and robust parts of the frame. There may also be more than one strap on each side. The straps allow a high flexibility for fastening different types of bicycles having various sizes and frame shapes. The fastening points 57 are preferably placed on the upper section of the vertical support for stabilizing the bicycle frame 100 at its upper section. When the straps 59 are tightened, the bicycle frame 100 has a firm position inside the frame 12, and only minimal movements are allowed relative to the frame, and no contact between the bicycle frame 100 or parts of the bicycle frame will occur other than between the bottom bracket 170 and the cushion 72 of the bottom bracket support 70 and the front forks to the front fork support 80 (and possibly also to other equipment placed inside the bag, such as wheels, depending on the placement). The bicycle is thus fixed to the bag frame in at least four different locations, two at the bottom and one fixation point to the vertical front frame and one to the vertical rear frame. This ensures a reliable and safe protection of the bicycle frame 100, preventing damage or wear caused by undesired movements, hits or rubbing towards other parts. The tighter the straps 74, 84 and 59, the lesser movement is allowed. At this point, the bicycle bag 10 is ready to be closed with the cover 30.

In one embodiment (not shown), the bottom bracket support 70 and/or front fork support 80 may even be substituted by additional straps for suspending the bicycle completely inside the frame structure 12 of the bicycle bag 10. This requires several attachment points and attachment straps of the bicycle and the bag, and that the straps may be firmly tightened to robust fastening points so that the bicycle frame may be suspended more or less in the center of the frame structure 12.

Figure 11:
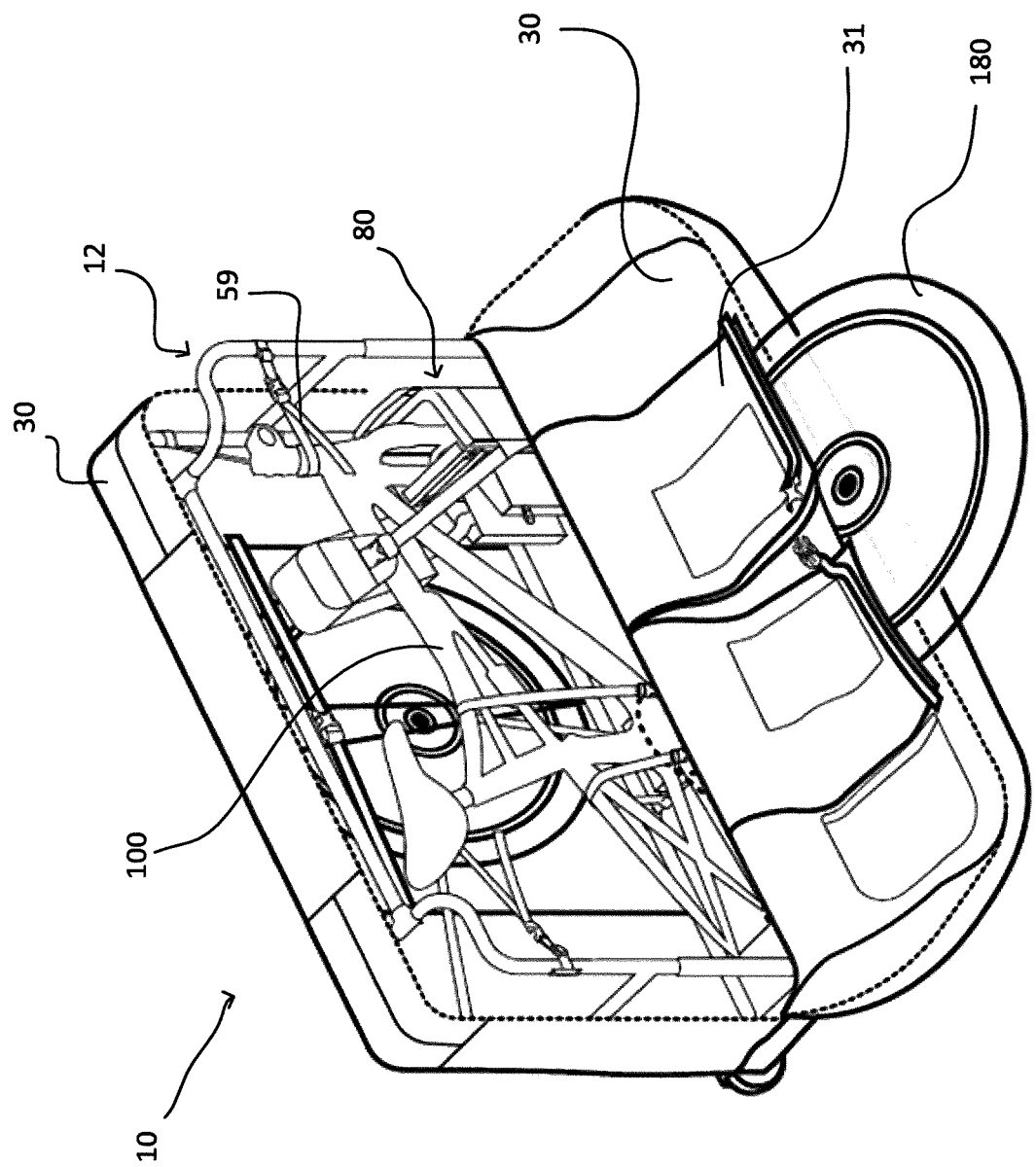
FIG. 11 shows schematically in a perspective view a frame of a bicycle bag with a flexible cover in partly opened state and the frame in mounted state and with a bicycle frame mounted into the frame and strapped to the frame.

FIG. 11 shows schematically a final step in the mounting process where the bicycle frame 100 is firmly mounted into the bicycle bag 10 and with all straps tightly fastened. The bicycle wheels 180 are mounted in pockets 31 on the inside of the cover 30. These pockets 31 may be detachable or integrated into the cover. Additional pockets may be provided internally or externally for storing pedals or other loose equipment. In FIG. 11, one side section of the cover 30 is stretched over one side of the frame 12. Accordingly, the other side section of the cover 30 may be stretched over the other side of the frame 12, so that the two side sections meet to close a zipper or similar fastening means, as shown schematically in FIG. 12. In FIG. 12, one can also see how the cover obtains a similar shape to the frame 12 once stretched over the frame, thus providing a box shaped protection cover for the bicycle 100. The bicycle bag 10 may have wheels fastened to the bottom part of the bag, and the wheels may also be detachable. When the bag is in mounted state, as in FIG. 12, the straps for strapping around the bag in compressed state are not needed, and may typically be placed inside pockets, as shown in FIG. 13.

REFERENCE NUMBERS 10 bicycle bag
12 protective frame
13 shock-absorbing section
14 bag wheel
20 bottom frame
22,24 bottom frame horizontal, longitudinal rod
25 lower part of vertical rod (below lower hinge 52, 62)
26,28 bottom frame horizontal, transverse rods
30 flexible cover
31 pockets
34 straps for compression of bag
40 top frame
41 fastening organ for top frame e.g. clip
50 vertical front frame
51 upper hinge
52 lower hinge
53 curved element
54 vertical rod
55 transverse rod (vertical part)
56 transverse rod (top)
57 fastening points
58 elastic cord
59 straps
60 vertical rear frame
61 upper hinge
62 lower hinge
63 curved element
64 vertical rod
65 transverse rod (vertical part)
66 transverse rod (top)
70 bottom bracket support
71 clips
72 cushion
73 cross bar
74 straps
80 front fork support
81 clips
82 cross bar
83 fork protector
84 straps
85 padded pocket
90 handlebar holder
100 bicycle frame
110 top tube
120 seat stays
130 front fork
140 handlebar
150 seat tube
160 handlebar stem
170 bottom bracket
180 bicycle wheel

The invention claimed is:

1. A bicycle bag (10) for storage and transport of a bicycle, the bag (10) comprising:
  a protective frame (12) having a rigid longitudinal bottom frame (20) extending between a first end and a second end arranged longitudinally opposite the first end, a substantially vertical front frame (50) and a rear frame (60) extending upwards from the respective first and second ends of the bottom frame (20), each of the front frame (50) and rear frame (60) extending upward to a respective upper end, and a detachable top frame (40) extending between the upper end of the front frame (50) and rear frame (60), the frame (12) defining a protective cavity arranged to accommodate the bicycle, one or more bicycle supports configured to fasten the bicycle to the bottom frame (20), and a flexible cover (30) configured to enclose the protective frame (12), wherein each of the vertical front frame (50) and the vertical rear frame (60) is hinged in a lower portion thereof, with upper portions of the front and rear frames being configured to be folded towards a longitudinal end of the bottom frame (20) to thereby collapse the bag.

2. The bicycle bag according to claim 1, wherein the front frame (50), rear frame (60), and bottom frame (20) constitute a single unit.

3. The bicycle bag according to claim 1, wherein each of the vertical front frame (50) and rear frame (60) comprises at least one hinge for folding.

4. The bicycle bag according to claim 1, wherein the bicycle support comprises one or more of a bottom bracket support (70) and a front fork support (80).

5. The bicycle bag according to claim 3, wherein the bicycle support comprises one or more of a bottom bracket support (70) and a front fork support (80).

6. The bicycle bag according to claim 4, wherein the one or more of a bottom bracket support (70) and front fork support (80) is detachably arranged on the bottom frame (20).

7. The bicycle bag according to claim 1, wherein the protective frame (12) comprises a plurality of sections (13), thereby providing shock absorbing characteristics to the frame (12).

8. The bicycle bag according to claim 3, wherein the protective frame (12) comprises a plurality of sections (13), thereby providing shock absorbing characteristics to the frame (12).

9. The bicycle bag according to claim 4, wherein the protective frame (12) comprises a plurality of sections (13), thereby providing shock absorbing characteristics to the frame (12).

10. The bicycle bag according to claim 7, wherein one or more of the plurality of sections (13) is an integral part of the rear frame (50), front frame (60) or both.

11. The bicycle bag according to claim 10, wherein the sections (13) are made of a resilient material or a spring mechanism.

12. The bicycle bag according to claim 1, wherein the flexible cover (30) comprises one or more of side sections, a front section, a back section and a top section having stiffening elements attached thereto.

13. The bicycle bag according to claim 1, wherein an upper part of one or both of the vertical front frame (50) and vertical rear frame (60) is hinged and foldable outwards when the top frame is detached.

14. The bicycle bag according to claim 7, wherein an upper part of one or both of the vertical front frame (50) and vertical rear frame (60) is hinged and foldable outwards when the top frame is detached.

15. The bicycle bag according to claim 3, wherein an upper part of one or both of the vertical front frame (50) and vertical rear frame (60) is hinged and foldable outwards when the top frame is detached.

16. The bicycle bag according to claim 1, wherein each of the rear frame (50) and front frame (60) is self-supporting after mounting to the bottom frame (20).

17. The bicycle bag according to claim 7, wherein each of the respective sections (13) is made of a resilient material or a spring mechanism.

18. The bicycle bag according to claim 10, wherein each of the respective sections (13) is made of a resilient material or a spring mechanism.

19. A bicycle storage and transport bag comprising:
a protective frame defining a protective cavity to accommodate a bicycle and comprising a rigid longitudinal bottom frame extending between a first end and a second end located longitudinally opposite the first end, a substantially vertical front frame and a substantially vertical rear frame extending upwards from the respective first and second ends of the bottom frame, a detachable top frame extending between an upper end of the front frame and an upper end of the rear frame;
one or more bicycle supports configured to fasten the bicycle to the bottom frame, and
a flexible cover configured to enclose the protective frame,
wherein an upper portion of the front frame is connected to a lower portion of the front frame with a joint,
wherein an upper portion of the rear frame is connected to a lower portion of the rear frame with a joint, and
wherein the upper portion of the front and rear frames are configured to be folded at the respective joint towards the bottom frame to achieve a collapse state of the bag system.

20. A bicycle storage and transport bag system comprising:
a protective frame defining a protective cavity to accommodate a bicycle and comprising a rigid longitudinal bottom frame extending between a first end and a second end located longitudinally opposite the first end, a substantially vertical front frame and a substantially vertical rear frame extending upwards from the respective first and second ends of the bottom frame, a detachable top frame extending between an upper end of the front frame and an upper end of the rear frame;
one or more bicycle supports configured to fasten the bicycle to the bottom frame, and
a flexible cover configured to enclose the protective frame,
wherein an upper portion of the front frame is connected to a lower portion of the front frame with a hinge joint,
wherein an upper portion of the rear frame is connected to a lower portion of the rear frame with a hinge joint, and
wherein the upper portion of the front and rear frames are configured to be folded towards the bottom frame to achieve a collapse state of the bag system.

* * * * *